C. W. STULTZ.
BUILDING FLANGES FOR TIRES.
APPLICATION FILED JULY 17, 1914.
1,161,906.
Patented Nov. 30, 1915.
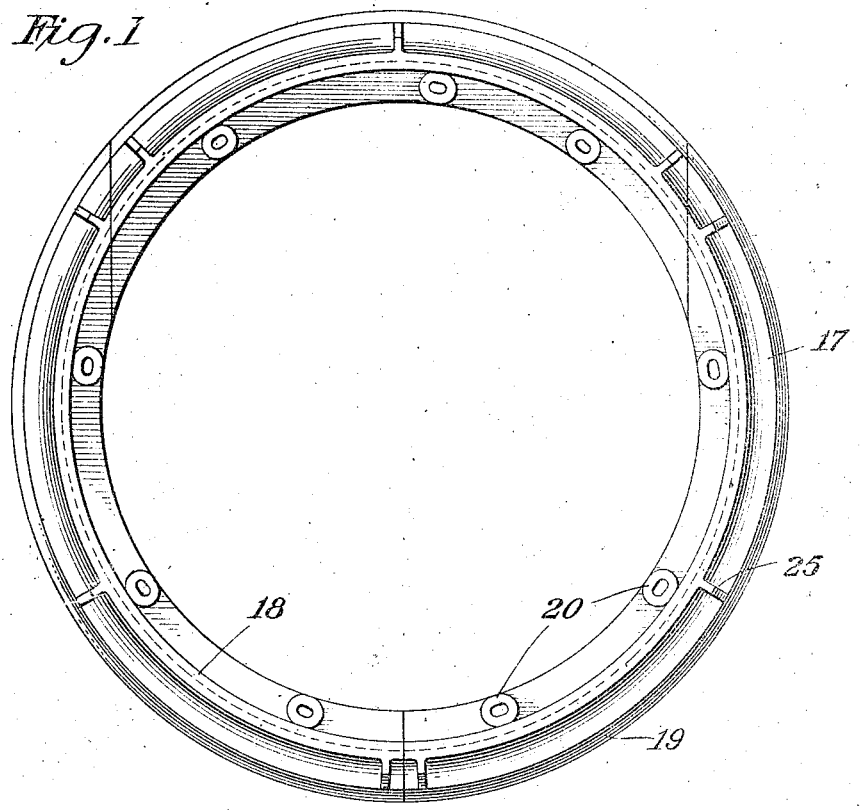
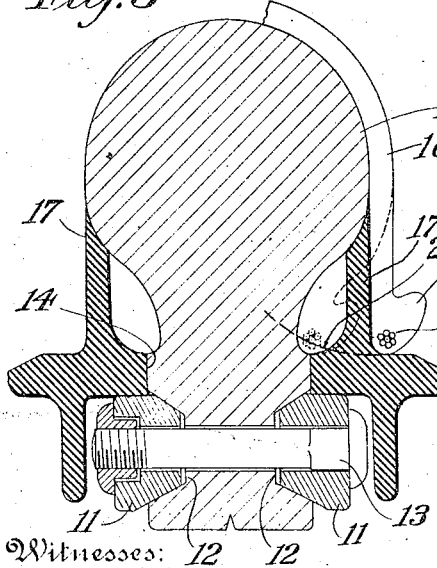
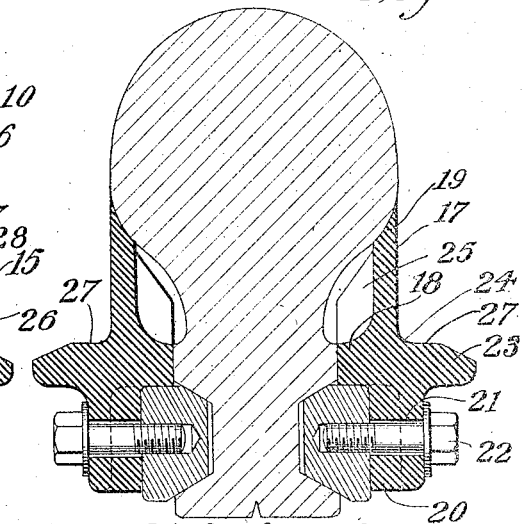
Witnesses:
Raphael Netter
Francis Boyle
Charles W. Stultz, Inventor
By his Attorney
Ernest Hopkins

UNITED STATES PATENT OFFICE.

CHARLES W. STULTZ, OF INDIANAPOLIS, INDIANA, ASSIGNOR TO G & J TIRE COMPANY, A CORPORATION OF NEW JERSEY.

BUILDING-FLANGES FOR TIRES.

1,161,906.

Specification of Letters Patent. Patented Nov. 30, 1915.

Application filed July 17, 1914. Serial No. 851,450.

*To all whom it may concern:*

Be it known that I, CHARLES W. STULTZ, a citizen of the United States, residing at Indianapolis, county of Marion, State of Indiana, have invented certain new and useful Improvements in Building-Flanges for Tires, of which the following is a full, clear, and exact disclosure.

This invention relates to the manufacture of tires of the open-bellied type and has for an object to provide a device which will simplify the laying on of the fabric and which will promote the symmetrical building of the tire upon the core so that the fabric will be properly stretched as the mold closes upon it in the press to obviate wrinkles which constitute one of the most frequent defects in full molded tire construction at the present time.

In building tires, it is old to initially space the sides of the tire from the sides of the ring core upon which the tire is built and it is also old to embed an inextensible ring formed of a plurality of turns of wire in each bead of the tire while the tire is under construction. It is old to subsequently press the straight sides of the tire to conform to the incurved sides of the core by the application of the side plates of a mold. The wire rings being inextensible maintain their own diameter during this operation and travel in a straight line, thereby stretching the fabric toward the inner periphery of the core.

It is very essential that the two sides of the tire be built symmetrical to insure a uniform stretch therein when the mold closes upon the tire. The present invention accomplishes this result by means of similar flanges which are attached to opposite sides of the ring core and space the sides of the tire from the ring core, each flange having upon its outer face a ledge which supports and positions the bead of the adjacent side of the tire concentric with the axis of the tire.

In the accompanying drawing, an apparatus suitable for the practice of my invention is shown, in which drawing:

Figure 1 is a rear elevation of a flange constructed in accordance with my invention; Fig. 2 is a cross-sectional view through a ring core equipped with my improved flanges; Fig. 3 is a cross-sectional view through the core and flanges, with a fragmentary portion of a tire shown diagrammatically thereon.

Referring to the drawing, 10 designates a ring core of the usual and well known type employed in building tires, the core being made in sections which are secured together by clamp rings 11 sunk in tapered sockets 12 in the sides of the sections and bolted in place, as shown at 13. There is an annular rib 14 on each side of the core contiguous with the constricted portion of the core, these ribs forming seats for the bead 15 of the tire 16.

In carrying out my invention, I provide similar flanges 17, one for each side of the core, each flange being formed in sections corresponding in number to and coinciding with the sections of the core, in the present embodiment there being three of these sections, as shown in Fig. 1. Each flange is provided on the inner face with a ledge 18 which abuts against the adjacent rib 14 and top face of the adjacent clamp ring 11 and positions the flange parallel with the plane of the core, with the outer face in the outer plane of the core, the outer edge 19 of the flange being beveled to conform to the configuration of the core. Upon the inner face of the flange below the ledge 18, bosses 20 are formed, the flange and bosses being provided with openings 21 which receive screws 22 that are threaded into the outer face of the adjacent clamp ring and detachably secure the flange in place. The flange is formed on the outer face with a ledge 23 which extends at a right angle to the flange, the outer periphery of the ledge extending in alinement with the outer periphery of the rib 14 on the core and being rounded at its juncture with the flange, as shown at 24, to seat the bead 15 of the tire while the tire is under construction. To resist distortion of the flange, the sections are reinforced by webs 25 which bridge the angle between the inner face of the flange and the top face of the inner ledge 18.

In building the tire upon a core equipped with the above described flanges, the successive layers of tire fabric are initially applied medially to the crown of the core 10 and then pressed at the sides against the straight parallel flanges 17, the layers being directed at the edges to confine the wire reinforcing rings 26 and to form the bead 15 of the tire. While the tire is under construction, the outer ledges 23 support and maintain the wire rings and beads concentric with the axis of the tire. The working faces 27 of the outer ledges of both flanges extend in a plane that is perpendicular to the plane of the core, thus insuring that both sides of the tire will be built symmetrical. Preparatory to the application of the mold the flanges are removed from the core. Since the wire rings are inextensible, they maintain their own diameter and carry the beads in a straight line when the mold closes upon the tire in the press, instead of in an arc, such as shown at 28, whereby a stretch is imparted to the sides of the tire corresponding to the distance between the arc 28 and the rib 14 of the core, thereby obviating all wrinkles and insuring a uniform tension throughout the sides of the tire.

While I have illustrated and described the particular construction of the straight flange, I do not limit myself to the exact construction shown, it being only necessary to the practice of my invention that a flange be employed which is provided on the outer face with a ledge for supporting and positioning the bead of the tire concentric with the axis of the tire while the tire is under construction.

Having described my invention, what I claim and desire to protect by Letters Patent is:

1. A tire building machine embodying a ring core having incurved sides, removable flanges on the core having parallel outer faces extending over said incurved sides in the outer planes of the core, and annular ledges on the outer faces of the flanges disposed adjacent to said sides and concentric with the axis of the core.

2. A tire building machine embodying a ring core having incurved sides and having annular ribs contiguous with said sides, flanges on the sides of the core extending parallel with the plane of the core, and annular ledges on the outer faces of the flanges having their outer peripheries in alinement with the outer peripheries of the ribs.

3. A tire building machine embodying a ring core having incurved sides and having ribs contiguous with said sides, flanges on the sides of the core extending parallel with the plane of the core, and annular ledges on the outer faces of the flanges disposed adjacent to said ribs and having their outer peripheries extending in a plane which is perpendicular to the plane of the core.

4. A tire building machine embodying a ring core having incurved sides and having annular ribs contiguous with said sides, flanges on the sides of the core extending parallel with the plane of the core, and annular ledges on the outer faces of the flanges having their outer peripheries extending in alinement with the outer peripheries of the ribs and extending in a plane which is perpendicular to the plane of the core.

5. A tire building machine embodying a sectional ring core having incurved sides, annular ribs contiguous with said sides, clamp rings below the ribs removably securing the sections of the core together, annular flanges extending over said incurved sides, ledges on the inner faces of the flanges abutting against the outer faces of the ribs and against the top faces of the rings, means removably securing the flanges to the rings, and ledges on the outer faces of the flanges concentric with the axis of the core.

Signed at Indianapolis, county of Marion, and State of Indiana, this 13th day of July, 1914.

CHARLES W. STULTZ.

Witnesses:
W. B. HARDING,
E. J. RYGLER.